United States Patent [19]

Yoshimi et al.

[11] Patent Number: 4,463,801

[45] Date of Patent: Aug. 7, 1984

[54] AIR INDUCTION CONTROL SYSTEM FOR VEHICLE AIR CONDITIONERS

[75] Inventors: Akiro Yoshimi; Takeshi Kuwajima, both of Kariya; Fumio Ootsuka, Gifu; Takeo Matsushima, Toyota, all of Japan

[73] Assignees: B Nippondenso Co., Ltd., Kariya; Toyota Jidosha Kogyo Kabushiki Kaisha, Toyota, both of Japan

[21] Appl. No.: 348,300

[22] Filed: Feb. 12, 1982

[30] Foreign Application Priority Data

Feb. 16, 1981 [JP] Japan ................................ 56-21708

[51] Int. Cl.³ ............................ B60H 3/00; F25B 1/00
[52] U.S. Cl. ........................................ 165/43; 165/12; 165/16; 62/244; 237/5
[58] Field of Search ................... 165/12, 16, 24, 42, 165/43, 36; 62/180, 244; 237/2 A, 5

[56] References Cited

U.S. PATENT DOCUMENTS

| | | | |
|---|---|---|---|
| 4,320,628 | 3/1982 | Okajima | 165/16 |
| 4,325,426 | 4/1982 | Otsuka et al. | 165/43 |
| 4,333,606 | 6/1982 | Shimada et al. | 165/16 |
| 4,344,565 | 8/1982 | Kojima et al. | 165/12 |
| 4,355,681 | 10/1982 | Shimada et al. | 165/16 |
| 4,358,050 | 11/1982 | Naganoma et al. | 165/42 |
| 4,358,936 | 11/1982 | Ito et al. | 165/43 |

FOREIGN PATENT DOCUMENTS

| | | | |
|---|---|---|---|
| 2379392 | 10/1978 | France | 165/43 |
| 55-77659 | 6/1980 | Japan . | |
| 55-162554 | 12/1980 | Japan | 165/16 |

Primary Examiner—William R. Cline
Assistant Examiner—Edward P. Walker
Attorney, Agent, or Firm—Cushman, Darby & Cushman

[57] ABSTRACT

A vehicle air conditioner control apparatus for supplying into the passenger compartment of a vehicle a flow of air which is temperature controlled in accordance with air conditioner control conditions, automatically controls an air change-over damper in response to a manual setting device for selectively commanding the induction of outside air, the induction of inside air and the induction of outside and inside air into an air duct and in response to a signal indicative of an absolute temperature of air inducted into the air duct, which is computed and generated in accordance with the outputs of a plurality of sensors.

10 Claims, 2 Drawing Figures

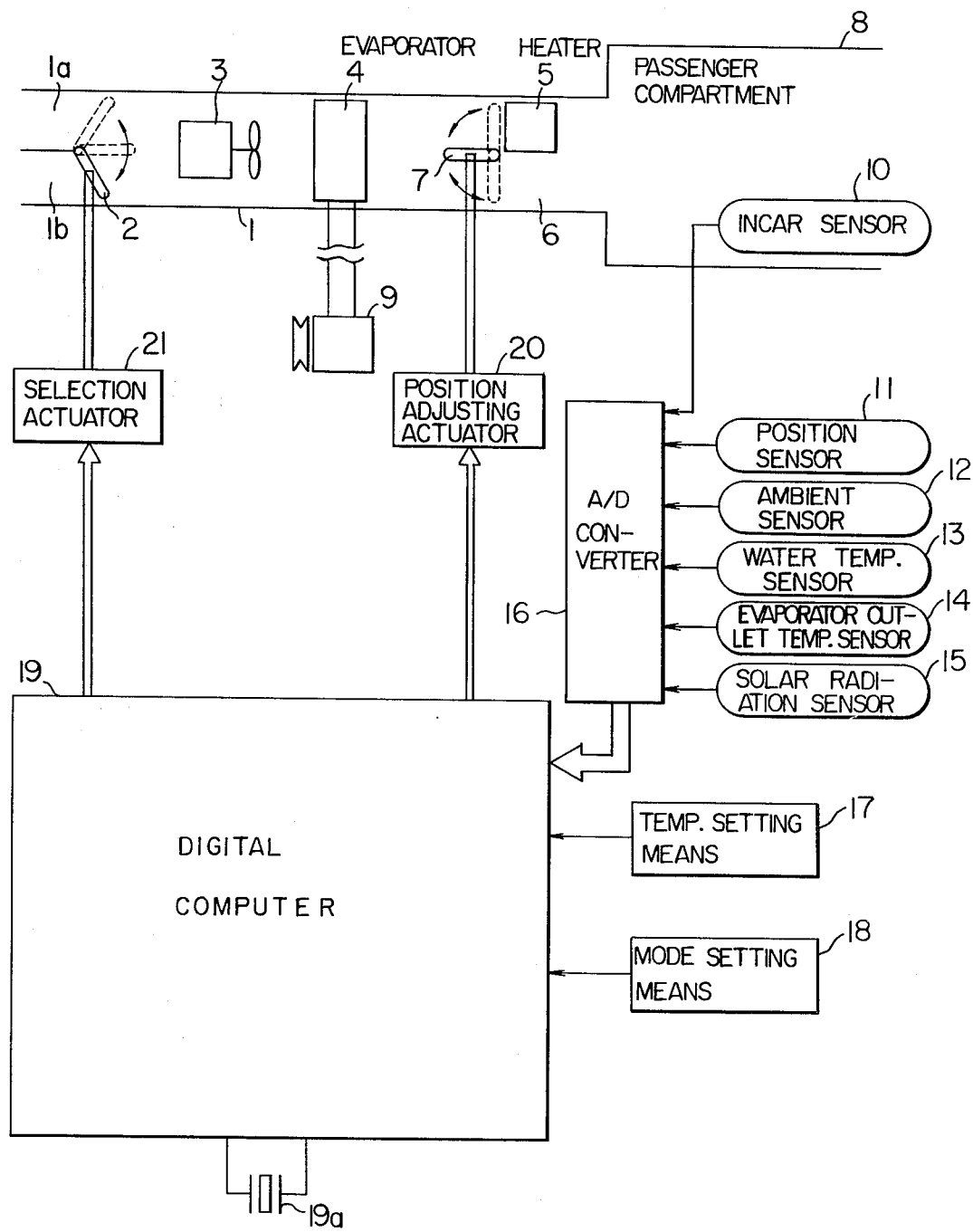

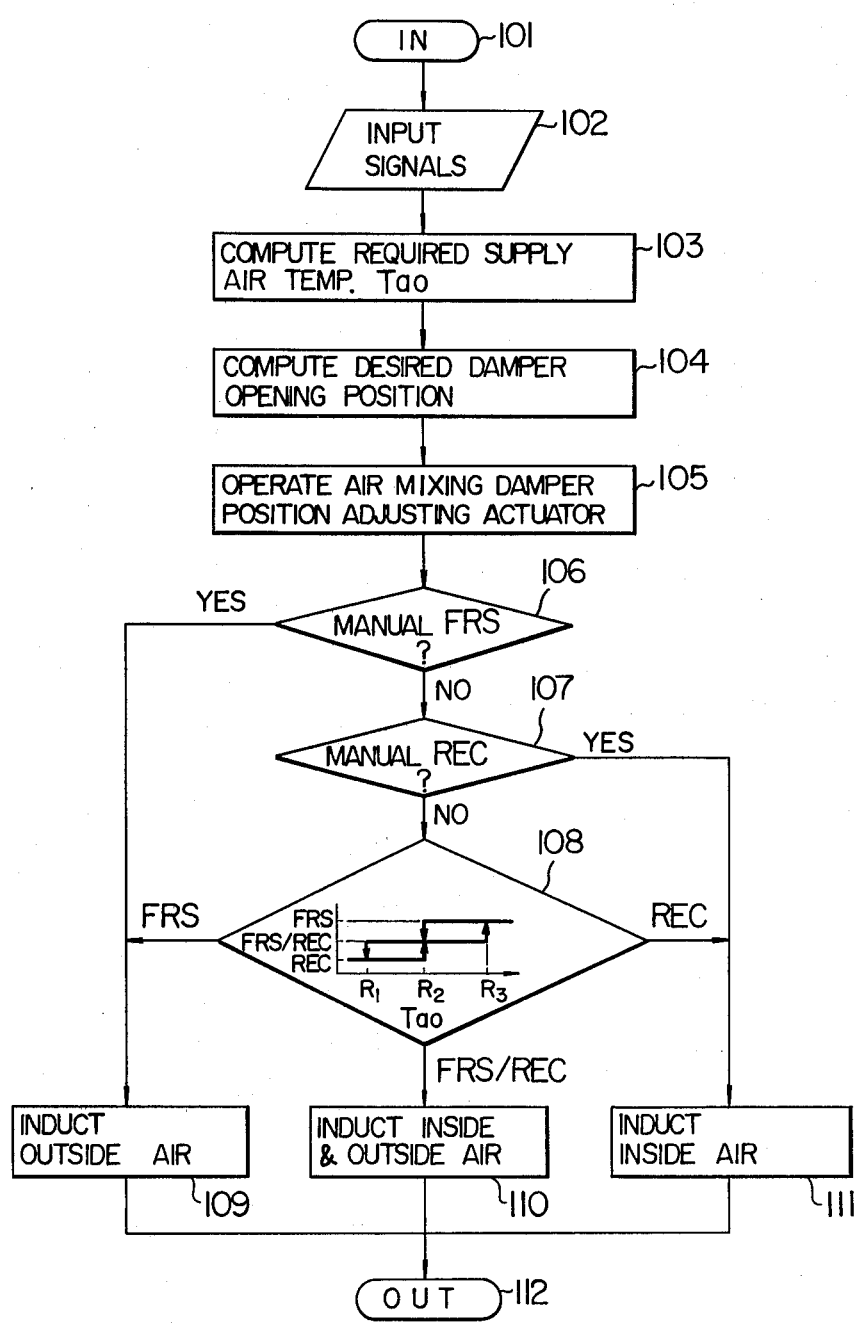

AIR INDUCTION CONTROL SYSTEM FOR VEHICLE AIR CONDITIONERS

BACKGROUND OF THE INVENTION

The present invention relates to control systems for vehicle air conditioners and more particularly to a control system for selectively inducting air into an air duct from inside and outside the passenger compartment of a vehicle.

With vehicle air conditioners, a variety of techniques are heretofore known in the art which automatically control the induction of air from inside the compartment and the induction of air from outside the compartment and these known techniques include, for example, systems of the type in which an air induction electromechanical actuator is operated by a switch which is mechanically operatively associated with the position of temperature adjusting means such as an air mixing damper, thereby automatically effecting changeover from the induction of the inside air to the induction of the outside air or vice versa.

However, this type of known system is linearly associated operatively only with temperature adjusting means so that due to the effects of variations in the thermal exchanging capacity of thermal exchangers disposed in an air duct, such as, the operation and stopping of a cooling compressor, variations in the compressor rotation speed due to the vehicle engine or variations in the temperature of the engine cooling water, the temperature of the supply air is sometimes varied even for the same position of the temperature adjusting means and thus it is impossible to effect change-over from one mode of air induction to another on the basis of a predetermined supply air temperature.

SUMMARY OF THE INVENTION

It is the primary object of this invention to provide an air-induction control system in which the change-over from one mode of air induction to another and the adjustment of temperature are controlled in relation to the absolute temperature of supply air, thereby overcoming the foregoing deficiencies in the prior art.

BRIEF DESCRIPTION OF THE DRAWINGS

FIG. 1 is a schematic block diagram showing an embodiment of the invention.

FIG. 2 is a flow chart useful for explaining the computational operations of the digital computer shown in FIG. 1.

DESCRIPTION OF THE PREFERRED EMBODIMENT

Referring to FIG. 1 illustrating a schematic block diagram showing an embodiment of the invention, numeral 1 designates an air duct disposed in front of a vehicle passenger compartment 8 and having its upper part connected to an inlet port 1a for the air outside the compartment and an inlet port 1b for the air inside the compartment. Numeral 2 designates an air change-over damper disposed in the upper part of the air duct 1 so as to be operated to select one of an outside air induction mode, an inside air induction mode and an intermediate induction mode for introducing a mixture of the outside and inside air. Numeral 3 designates a blower which is energized by a vehicle battery upon closing of a main switch which is not shown so as to cause an air flow within the air duct 1 which is directed from the air change-over damper 2 toward the compartment 8.

Numeral 4 designates an evaporator serving as a cooling thermal exchanger and forming, along with a compressor 9 driven from a vehicle engine and other components which are not shown, a known type of air cooling unit for cooling the air flow passing through the air duct 1. The air cooling unit includes an electromagnetic clutch for coupling the compressor 9 to the vehicle engine and the clutch is energized forcibly upon closing of the main switch or it is energized by an output of a known type of automatic control circuit thereby effecting the above-mentioned cooling operation.

Numeral 5 designates a heater serving as a heating thermal exchanger and adapted to circulate the engine cooling water as a heat source. The heater 5 occupies about one half of the air passage cross-sectional area of the air duct 1 and the remaining area forms a bypass passage 6.

Numeral 7 designates an air mixing damper which forms temperature adjusting means whereby the rate at which the cooled air from the evaporator 4 is heated by the heater 5 and the rate at which the cooled air is directly passed through the bypass passage 6 are varied thereby adjusting the temperature of the supply air issuing from the air duct 1 into the vehicle chamber 8.

Numeral 10 designates an incar sensor for generating an analog electric signal $T_r'$ corresponding to the air temperature inside the compartment 8, 11 a position sensor for generating an analog electric signal $A_r'$ corresponding to the position of the air mixing damper 7, and 12 an ambient sensor for generating an analog electric signal $Tam'$ corresponding to the air temperature outside the compartment. The control apparatus also includes a heat power sensor means for generating an indication of the exchanged heat power of exchanger 5, such as water temperature sensor 13. Sensor 13 generates an analog electric signal $Tw'$ corresponding to the temperature at the cooling water inlet of the heater 5. Numeral 14 designates an evaporator outlet temperature sensor for generating an analog electric signal $Ta'$ corresponding to the temperature at the position just downstream of the evaporator 4 within the air duct 1, and 15 a solar radiation sensor for generating an analog electric signal $Ts'$ corresponding to the heat radiation or light intensity of the sun light incident to the vehicle compartment 8. Each of these sensor output electric signals is converted to a binary code signal by an analog-digital converter circuit 16.

Numeral 17 designates digital temperature setting means whereby a desired temperature set by the passenger is stored as a digital value Tset. Numeral 18 designates mode setting means for generating a digital signal indicative of the desired position of the air change-over damper 2 which is set by the passenger.

Numeral 19 designates a digital computer for collectively controlling the air change-over damper 2 and the air mixing damper 7 whereby in the course of computational operations performed in accordance with a control program preliminarily stored in an internal memory, change-over controlling command signals to the air change-over damper 2 and position controlling command signals to the air mixing damper 7 are generated in response to the input signals from the respective sensors and setting means.

The digital computer 19 comprises a so-called microcomputer comprising a single-chip LSI (large scale integrated circuit) including as its main components a program memory (ROM) storing an air conditioner control program, a central processing unit (CPU) for repeatedly performing the computational operations in accordance with the control program, a temporary memory (RAM) of the read/write type for temporarily storing the various data related to the computational operations of the CPU, a timing circuit with a crystal unit 19a to generate reference clock pulses for the computational operations, and an I/O circuit for controlling input and output signals.

Numeral 20 designates a position adjusting actuator for the air mixing damper 7, which comprises an electromechanical transducer responsive to a position controlling command signal from a digital computer 19 to change the position of the air mixing damper 7.

Numeral 21 designates a selection actuator for the air change-over damper 2, which comprises an electromechanical transducer responsive to a selection controlling command signal from the digital computer 19 to effect change-over of the operating mode of the air change-over damper 2 from one mode to another.

FIG. 2 illustrates the computational operation control program of the digital computer 19. When the main switch is closed, the digital computer 19 is supplied with power from the vehicle battery by way of a stabilized power supply circuit which is not shown and the computational operations shown in the Figure are repeated at intervals of several hundred ms. Note that the Figure shows only a processing part including from a step 101 to a step 112 and related to the gist of the present invention and the rest is omitted.

The control program includes a signal input step 102 for receiving the signals from the various input devices. The signal input step 102 stores the detection signals generated from the group of sensors 10 to 15 and converted to the binary code signals by the analog-digital converter circuit 16 in the associated storage locations of the RAM and it also stores the output signals of the setting means 17 and 18 in the associated storage locations of the RAM.

The next computation step 103 is responsive to the data indicative of the environmental condition in which the vehicle compartment 8 is placed to compute an absolute temperature Tao for the supply air flow from the air duct 1 which is required to bring to and maintain the vehicle compartment temperature at about the preset desired temperature. This computation is performed in accordance with the following equation using experimentally known constants $$Tao = Kset \times Tset - Kr \times Tr - Kam \times Tam - Ks \times Ts + C$$

where Tset, Tr, Tam and Ts are the values derived from the sensors 10, 12 and 15 and the setting means 17, and Kset, Kr, Kam, Ks and C are predetermined constants.

The next computation step 104 computes the required position SW of the air mixing damper 7 for actually obtaining the required supply air temperature Tao computed by the computation step 103 by way of the air duct 1. This computation is performed from the following equation by referring to the actual heat exchanging capacities of the evaporator 4 and the heater 5 which are heat exchangers $$SW = (Tao - Ta)/(Tw - Ta - D_1) \times D_2$$

where Ta and Tw are the values detected by the sensors 13 and 14 and $D_1$ and $D_2$ are predetermined constants.

The next command step 105 compares the position SW of the air mixing damper 7 computed by the computation step 104 with the actual damper position Ar detected by the sensor 11 to apply to the position adjusting actuator 20 a position controlling command signal for causing the latter to approach the former and come within a preset range of error.

The details of the steps 103, 104 and 105 are described in Japanese Laid-Open Patent Application No. 55-77659.

The next two decision steps 106 and 107 check the signal from the mode setting means 18 in accordance with the value stored in the RAM so as to determine whether the vehicle passenger has desired the induction (FRS) of air from outside the compartment or the induction (REC) of air from inside compartment. If the decision results in "YES" indicating that one of the induction modes has been desired, then a jump is made to a command step 109 or 111.

The command step 109 applies a section controlling command signal to the selection actuator 21 to cause the air change-over damper 2 to select the outside air induction mode. On the other hand, the command step 111 applies a selection controlling command signal to the selection actuator 21 so as to cause the air change-over damper 2 to select the inside air induction mode.

Thus, in operation, in order to provide the outside air induction mode or the inside air induction mode as a fixed mode for the system, it is only necessary to suitably operate the mode setting means 18.

On the other hand, where no such mode setting has been effected or alternatively the mode setting means 18 has set an automatic change-over mode, a decision step 108 discriminates the position of the air change-over damper 2 in accordance with the predetermined conditions. The decision step 108 uses the supply air temperature Tao computed by the computation step 103 so that its value is compared with predetermined threshold values $R_1$, $R_2$ and $R_3$ to discriminate the outside air induction mode, the inside air induction mode or the intermediate induction mode. Note that in this decision a suitable hysteresis is provided to prevent any hunting.

As a result of the decision, the inside air induction mode and the outside air induction mode are selectively selected in accordance with the low and high temperature ranges of the supply air temperature Tao. Thus, if the inside air induction mode or the outside air induction mode is selected, a jump is made to the command step 109 or 111 and the corresponding control command is applied to the selection actuator 2. On the contrary, if the intermediate induction mode is discriminated, a control signal is applied to the selection actuator 21 so as to select the intermediate induction mode for inducting a mixture of the air from inside and outside the compartment.

The above-described program steps are performed repeatedly so that if a change occurs in the environmental condition of the compartment 8, the position of the air mixing damper 7 is adjusted correspondingly so that the temperature of the air supplied to the compartment 8 is varied properly and the actual compartment temperature is maintained at the desired temperature.

Also, by virtue of the fact that the induction of air from inside or outside the compartment is selected in dependence on the temperature of the air supplied to the vehicle compartment, it is possible to realize the induction of air which corresponds properly to the environmental condition in which the vehicle compartment 8 is placed.

Further, in accordance with the above-described embodiment the intermediate induction of air from both inside and outside the vehicle compartment is also selected so that stable transition of the temperature adjustment is ensured even during the transitional period where the supply air temperature changes.

Further, in carrying out the invention the value of the temperature actually measured at the outlet of the air duct 1 may be used instead of using the temperature of the required supply air temperature obtained by computation.

From the foregoing it will be seen that in accordance with the invention there is a remarkable effect that the induction of air properly corresponding to the environmental condition in which the compartment is placed can be realized with the resulting improvement in the feeling of air conditioning.

We claim:

1. A vehicle air conditioner control apparatus comprising:

air duct means for supplying air to a compartment of a vehicle;

selecting means for selecting a source of air for said air duct means, said selecting means having a first position for providing air from inside said compartment to said air duct means and a second position for providing air from outside said compartment to said air duct means;

blower means disposed in said air duct for causing a flow of air directed to said compartment;

air temperature changing means including a heat exchanging device disposed in said air duct means for effecting heat exchange with said air flow and temperature adjusting means for adjusting the temperature of said air flow supplied to said compartment through said air duct means;

in car sensor means for generating a first signal indicative of an air temperature in said compartment;

ambient sensor means for generating a second signal indicative of an air temperature outside said compartment;

heat power sensor means for generating a third signal indicative of exchanged heat power of said heat exchanging device;

temperature setting means for generating a fourth signal indicative of a desired air temperature in said compartment;

electronic control means for: (1) computing a required temperature of supply air taken into said compartment from said air duct means in accordance with said first, second, and fourth signals, (2) producing a temperature control signal for controlling said temperature adjusting means in accordance with said required temperature and said third signal, and (3) comparing said required temperature with a predetermined standard value, and producing a first command signal when said required temperature is smaller than said predetermined standard value and producing a second command signal when said required temperature is larger than said predetermined standard value;

first actuator means for actuating said temperature adjusting means to adjust the temperature of said air flow in response to said temperature control signal;

second actuator means for actuating said selecting means to said first position in response to said first command signal, and to said second position in response to said second command signal.

2. Apparatus as in claim 1 further comprising mode setting means for selectively generating, in response to a manual operation, one of a first position selecting signal and a second position selecting signal, said first and second actuator means being responsive to said first and second position selecting signals, respectively.

3. Apparatus as in claim 2 wherein said comparing function of said electronic control means is performed only in the absence of said first and second position selecting signals, said first and second actuator means being responsive to said first and second position selecting signals independent of the existence of said first and second command signals so that said command signal producing function of said electronic control means controls said first and second actuator means only in the absence of said first and second position selecting means.

4. A vehicle air conditioner control apparatus comprising:

air duct means for supplying air to a compartment of a vehicle;

selecting means for selecting a source of air for said air duct means, said selecting means having a first position for providing air from inside said compartment to said air duct means and second position for providing air from outside said compartment to said air duct means;

blower means disposed in said air duct means for causing a flow of air directed to said compartment;

air temperature changing means including a heat exchanging device disposed in said air duct means for effecting heat exchange with said air flow and temperature adjusting means for adjusting the temperature of said air flow supplied to said compartment through said air duct means;

in car sensor means for generating a first signal indicative of an air temperature in said compartment;

ambient sensor means for generating a second signal indicative of an air temperature outside said compartment;

heat power sensor means for generating a third signal indicative of exchanged heat power of said heat exchanging device;

temperature setting means for generating a fourth signal indicative of a desired air temperature in said compartment;

electronic contol for: (1) computing a required temperature of supply air taken into said compartment from said air duct means in accordance with said first, second and fourth signals, (2) producing a temperature control signal for controlling said temperature adjusting means in accordance with said required temperature and said third signal, and (3) comparing said required temperature with each of a first predetermined standard value and a second predetermined standard value which is larger than said first predetermined standard value, and producing a first command signal when said required temperature is smaller than said first predetermined standard value and producing a second command signal when said required temperature is larger than said second predetermined standard value;

first actuator means for actuating said temperature adjusting means to adjust the temperature of said air flow in response to said temperature control signal; and second actuator means for actuating said selecting means to said first position in response to said first command signal and to said second position in response to said second command signal.

5. Apparatus as in claim 4 further comprising mode setting means for selectively generating, in response to a manual operation, one of first and second position selecting signals, said first and second actuator means being responsive to said first and second position selecting signals, respectively.

6. Apparatus as in claim 5 wherein said comparing means produces said first and second command signals only in the absence of said first and second position selecting signals, said first and second actuator means being responsive to said first and second position selecting signals, respectively, independent of the existence of said first and second command signals so that said first and second command signals influence said first and secnd actuator means, respectively, only in the absence of said first and second position selecting signals.

7. A vehicle air conditioner control apparatus comprising:

air duct means for supplying air to a compartment of a vehicle;

selecting means for selecting a source of air for said air duct means, said selecting means having a first position for providing air from inside said compartment to said air duct means, a second position for providing air from outside said compartment to said air duct means, and a third position for providing air from both inside and outside said compartment to said air duct means;

blower means disposed in said air duct means for causing a flow of air directed to said compartment;

air temperature changing means including a heat exchanging device disposed in said air duct means for effecting heat exchange with said air flow and a temperature adjusting means for adjusting the temperature of said air flow supplied to said compartment through said air duct means;

in car sensor means for generating a first signal indicative of the air temperature in said compartment;

ambient sensor means for generating a second signal indicative of an air temperature outside said compartment;

heat power sensor means for generating a third signal indicative of exchanged heat power of said heat exchanging device;

temperature setting means for generating a fourth signal indicative of a desired air temperature in said compartment;

electronic control means for: (1) computing a required temperature of supply air taken into said compartment from said air duct means in accordance with said first, second, and fourth signals, (2) producing a temperature control signal for controlling said temperature adjusting means in accordance with said required temperature and said third signal, and (3) comparing said required temperature with each of a first predetermined standard value and a second predetermined standard value which is larger than said first predetermined standard value, and producing a first command signal when said required temperature is smaller than said first predetermined standard value, producing a second command signal when said required temperature is larger than said second predetermined standard value and producing a third command signal when said required temperature is between said first predetermined standard value and said second predetermined standard value;

first actuator means for actuating said temperature adjusting means to adjust the temperature of said air flow in response to said temperature control signal; and second actuator means for actuating said selecting means to said first position in response to said first command signal, to said second position in response to said second command signal, and to said third position in response to said third command signal.

8. Apparatus as in claim 7 further comprising mode setting means for selectively generating, in response to a manual operation, one of a first position selecting signal and a second position selecting signal, said first and second actuator means being responsive to said first and second position selecting signals, respectively.

9. Apparatus as in claim 8 wherein said comparing means produces said first, second and third command signals only in the absence of said first and second position selecting signals, said first and second position selecting signals controlling said first and second actuator means, respectively, independent of the existence of said first, second and third command signals so that said producing function of said electronic control means controls said first and second actuator means only in the absence of said first and second position selecting signals.

10. Apparatus according to claim 7 wherein said comparing function of said electronic control means compares said required temperature with each of said first and second predetermined standard values when said required temperature is increasing and compares said required temperature with each of third and fourth predetermined standard values when said required temperature is decreasing, said third predetermined standard value being less than said first predetermined standard value and said fourth predetermined standard value being less than said second predetermined standard value, said electronic control means producing said first command signal when said required temperature is emaller than said first predetermined standard value when said required temperature is increasing and when said required temperature is smaller than said third predetermined standard value when said required temperature is decreasing, produces said second command signal when said required temperature is larger than said second predetermined standard value when said required temperature is increasing and when said required temperature is larger than said fourth predetermined standard value when said required temperature is decreasing, and produces said third command signal when said required temperature is between said first and second predetermined standard values when said required temperature is increasing and when said required temperature is between said third and fourth predetermined standard values when said required temperature is decreasing.

* * * * *